Nov. 4, 1930.                S. L. LEBBY                1,780,355
                              PROJECTOR
                          Filed Nov. 13, 1922
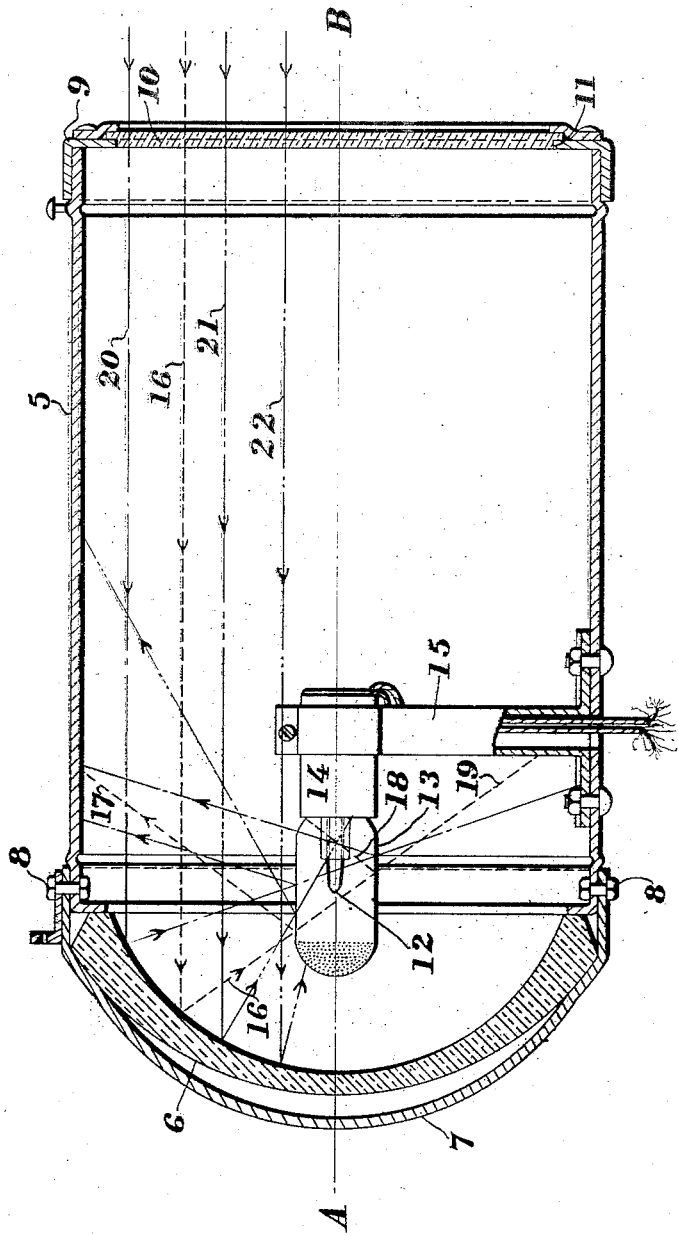
States Lee Lebby
INVENTOR
BY
ATTORNEY Patented Nov. 4, 1930

1,780,355

UNITED STATES PATENT OFFICE

STATES LEE LEBBY, OF CORNING, NEW YORK, ASSIGNOR TO CORNING GLASS WORKS, OF CORNING, NEW YORK, A CORPORATION OF NEW YORK

PROJECTOR

Application filed November 13, 1922. Serial No. 600,501.

This invention has for its object to provide an improved optical system and means of illumination which, while capable of use in projectors generally, is especially applicable for use in the projecting elements of railway signals. I will, therefore, in the following describe a form of my invention particularly developed for that use, but without limiting its application thereto.

When an electric lamp is used as the light source of optical projection systems it introduces, unless proper provision is made therefor, certain reflections tending to produce phantom signals, for the surfaces of a glass bulb, such as used to inclose an electric lamp filament, act as mirrors, reflecting a certain percentage (approximately 10 per cent) of all light impinging thereon. The light rays which produce such phantom signals come from external sources, such as the rays from the locomotive headlight approaching the projector, the rays from sunlight at low altitudes, or sunlight which may be reflected toward the projector, or the rays from any source of light in the neighborhood of the projector which may enter the same so as to strike the mirror or reflector thereof.

It has been found that this reflex illumination of a projector may be prevented by so shaping and locating the bulb in respect to the other parts of the optical system that the bulb in combination with the mirror (or lens and mirror) cannot project light entering the system along and to the zone of observation.

A bulb of relatively long cylindrical form located with its longitudinal axis in the focal axis of the projector meets these conditions. With the location of the filament of the lamp in the focal point of the mirror this places the tip of the bulb adjacent to the inner surface of the mirror out of the path of a majority of the light rays from the filament.

Referring to the accompanying drawing which is a vertical longitudinal section through a light projector, such as is used for railway signaling purposes, the projector comprises a cylindrical housing 5, having a horizontal axis A—B. Mounted in one end of the housing is a reflector or mirror 6, that is secured therein in any suitable manner, such as by means of a cover 7, which is detachably fastened to the housing by screws 8. In securing the mirror in position in the housing, the mirror is located centrally and squarely in the housing so that the axis of the mirror will coincide with the axis A—B of the housing.

The front of the housing is closed by a door 9 carrying a cover glass 10, the door being formed with a circular opening or aperture 11, through which the light beam from the reflector passes. By preference the inside of the housing 5 is painted a dull black.

The light source of the projector in the present instance is in the form of a V-shaped filament 12 that is inclosed in a glass bulb 13 of relatively long cylindrical form, the point of the filament being positioned at the focal point of the mirror 6 while the tip of the bulb is positioned away from the filament and adjacent to the surface of the mirror. The socket 14 of the light is carried by the upper end of a vertical hollow standard 15, that is bolted to the bottom of the housing 5. If so desired the standard 15 may be adjustably mounted in the housing in the manner shown and described in my application filed August 1, 1922, Serial Number 578,963, for light projectors.

In the construction of the light, here shown, I so proportion and arrange the parts that the side walls of the bulb are substantially parallel to the side walls of the housing 5, and the tip or spherical end of the bulb is positioned away from the filament a sufficient distance to prevent a majority of the light rays from the light source from passing therethrough. As shown, the tip of the bulb can be frosted, or the surface of the glass dulled, by sand blasting or etching, so as to produce a matted surface at the point where the curvature of the surface of the bulb is such that objectionable reflections of horizontal rays in the observation zone will be eliminated. I have further found that the tip commonly present in the bulbs of electric lamps as the result of the process of sealing subsequent to exhaustion may be a source of reflection in a structure such as here shown, and thus I prefer to use tipless lamps.

By referring to the drawings, it will be noted that the light ray 16, entering the projector from an external source, after reflection from the mirror 6, strikes the front longitudinal surface of the bulb 13 from such direction as to be partly reflected in the direction 17 to the longitudinal wall of the housing 5. Such part of the ray 16 as passes through the front wall strikes the rear wall of the bulb and a part thereof will be thereby reflected in the direction 18, parallel to the direction 17, and the remaining portion thereof will pass directly through the wall of the bulb in the direction 19.

Light rays 20 and 21 will also be reflected from the bulb in the directions shown by the arrows. Furthermore, a ray 22 entering the projector near the longitudinal axis A—B thereof, after reflection from the mirror 6, will strike the matted tip of the bulb and hence will not be reflected. Thus it will be seen that light rays which have heretofore tended to produce phantom signals in projectors having an electric lamp as the light source, cannot be reflected, with the use of my invention, in the general direction of the projected beam and be taken as an indication.

Having thus described my invention, what I claim is:—

1. In a projecting system, the combination of a mirror having a principal focal point, a light source at the focal point, a transparent vitreous enclosure for the light source surrounding the principal focal point and having side walls substantially parallel with the principal axis of the system and a curved end wall non-concentric with the principal focal point, and a housing enclosing the mirror and vitreous enclosure and having light absorbing interior walls for absorbing rays reflected by said vitreous enclosure, the housing being provided opposite the mirror with an opening through which may pass the light beam projected by the mirror.

2. The combination with a reflector, of a light source located at the focal point thereof and outside of said reflector, a transparent vitreous enclosure for the light source having cylindrical side walls, and an end wall located toward the reflector, said end wall being so shaped that no portion of its surface which is outside of the axis of the reflector will be normal to rays entering the reflector and directed thereby toward the focal point, and a housing having light-absorbing interior walls for absorbing rays reflected by said vitreous enclosure, said housing having an opening for the beam projected by the reflector.

3. The combination with a reflector having a principal focal point, of a light source located substantially at the focal point of the reflector, and a transparent enclosure elongated in the direction of the axis of the reflector and surrounding the light source, the enclosure having walls arranged in positions oblique to rays entering the reflector from an outside source and directed by the reflector in the direction of its focal point.

In testimony whereof, I have hereunto signed my name this 9th day of November, 1922.

STATES LEE LEBBY.